United States Patent
Shand et al.

(10) Patent No.: US 7,965,642 B2
(45) Date of Patent: Jun. 21, 2011

(54) COMPUTING PATH INFORMATION TO A DESTINATION NODE IN A DATA COMMUNICATION NETWORK

(75) Inventors: Ian Michael Charles Shand, Reading (GB); Stewart Frederick Bryant, Reading (GB)

(73) Assignee: Cisco Technology, Inc., San Jose, CA (US)

( * ) Notice: Subject to any disclaimer, the term of this patent is extended or adjusted under 35 U.S.C. 154(b) by 800 days.

(21) Appl. No.: 11/851,203

(22) Filed: Sep. 6, 2007

(65) Prior Publication Data

US 2009/0067330 A1    Mar. 12, 2009

(51) Int. Cl.
*G01R 31/08*    (2006.01)
(52) U.S. Cl. .................................. 370/238; 370/254
(58) Field of Classification Search .................. None
See application file for complete search history.

(56) References Cited

U.S. PATENT DOCUMENTS

| | | | |
|---|---|---|---|
| 7,080,161 B2* | 7/2006 | Leddy et al. ................. 709/250 |
| 7,088,718 B1* | 8/2006 | Srivastava .................... 370/392 |
| 7,450,495 B2* | 11/2008 | Guerin et al. ................ 370/217 |
| 7,584,298 B2* | 9/2009 | Klinker et al. ............... 709/238 |
| 7,647,426 B2* | 1/2010 | Patel et al. ................... 709/239 |
| 2003/0105865 A1* | 6/2003 | McCanne et al. ............ 709/225 |
| 2006/0153200 A1* | 7/2006 | Filsfils et al. ............ 370/395.31 |
| 2006/0274645 A1* | 12/2006 | Bradford et al. ............ 370/216 |
| 2008/0049622 A1 | 2/2008 | Previdi |
| 2008/0056151 A1* | 3/2008 | Gazier et al. ................ 370/252 |
| 2008/0056264 A1* | 3/2008 | Ong ............................ 370/392 |
| 2008/0080473 A1 | 4/2008 | Thubert |
| 2008/0205271 A1* | 8/2008 | Aissaoui et al. ............. 370/235 |
| 2008/0267088 A1* | 10/2008 | Dunbar et al. .............. 370/254 |

OTHER PUBLICATIONS

Johnson, D. The Dynamic Source Routing Protocol. Network Working Group [online], Feb. 2007 [retrieved on Sep. 10, 2008]. Retrieved from the Internet: <URL: http://tools.ietf.org/html/rfc4728>.
Dijkstra's Algorithm. Wikipedia, the free encyclopedia. [retrieved on Sep. 10, 2008]. Retrieved from the Internet: <URL: http://en.wikipedia.org/wiki/Dijkstra's_algorithm>.
Link-State Routing Protocol. Wikipedia, the free encyclopedia. [retrieved on Sep. 10, 2008]. Retrieved from the Internet: <URL: http://en.wikipedia.org/wiki/Link-state_routing_protocol>.

* cited by examiner

*Primary Examiner* — Phirin Sam
(74) *Attorney, Agent, or Firm* — Hickman Palermo Truong & Becker LLP (57) ABSTRACT

Approaches for computing path information to a destination node in a data communications network are described. A data communications network comprises as components nodes and links therebetween and comprising a core subdomain of components and a plurality of non-core subdomains of components and having a common identifier for each non-core subdomain. An apparatus comprises first logic which when executed is operable to receive reachability information for a destination node and an associated identifier; and second logic which when executed is operable to perform a computation of path information for a path in the network to a destination node dependent on a particular identifier of a subdomain associated with the destination node, and to forward data for the destination over the path according to the path information.

28 Claims, 6 Drawing Sheets

COMPUTING PATH INFORMATION TO A DESTINATION NODE IN A DATA COMMUNICATION NETWORK

TECHNICAL FIELD

The present disclosure generally relates to computing network path information. The disclosure relates more specifically to computing path information to a destination node in a data communication network.

BACKGROUND

Unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (usually routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in the direction BA. Based on the advertised information in the form of a link state packet (LSP) each node constructs a link state database (LSDB), which is a map of the entire network topology and from that constructs generally a single optimum route to each available node based on an appropriate algorithm such as, for example, a shortest path first (SPF) algorithm.

As a result, in the "control plane", a "shortest path spanning tree" (SPT) is constructed, rooted at the node and showing an optimum path including intermediate nodes to each available destination node. The results of the SPF are stored in a routing information base (RIB) and based on these results, in the "forwarding plane", the forwarding information base (FIB) or forwarding table is updated to control forwarding of packets appropriately. When there is a network change, an LSP representing the change is flooded through the network by each node adjacent the change, each node receiving the LSP and sending it to each adjacent node.

As a result, when a data packet for a destination node arrives at a node (the "first node"), the first node identifies the optimum route to that destination and forwards the packet to the next node along that route. The next node repeats this step and so forth.

Generally, data is forwarded along a single link to an adjacent node but in some instances an "equal cost multipath (ECMP)" occurs in which two or more equal lowest cost routes are available. In that case the forwarding node will implement load balancing whereby the load is shared equally between the links.

DETAILED DESCRIPTION

Computing path information in a data communication network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Apparatus and method for computing path information
4.0 Implementation Mechanisms-Hardware Overview
5.0 Extensions and Alternatives
1.0 General Overview Approaches for computing path information to a destination node in a data communications network are described. In one embodiment, an apparatus comprises a network interface configured to couple to a destination node in a data communications network having as components nodes and links therebetween and comprising a core subdomain of components and a plurality of non-core subdomains of components and having a common identifier for each non-core subdomain; first logic which when executed is operable to receive reachability information for a destination node and an associated identifier; and second logic which when executed is operable to perform a computation of path information for a path in the network to a destination node dependent on a particular identifier of a subdomain associated with the destination node, and to forward data for the destination over the path according to the path information.

In one feature, the apparatus further comprises logic which when executed is operable to perform the path computation dependent on a number of non-core subdomain identifiers associated with components on the path to the destination. In another feature, the apparatus further comprising logic which when executed is operable to suppress a path to a destination node in a non-core subdomain.

In another feature, the apparatus further comprises logic which when executed is operable to suppress a path if the number of non-core subdomain identifiers exceeds a suppression threshold. In another feature, the apparatus further comprises logic which when executed is operable to identify a second path to the destination node as an alternative to the suppressed path. In yet another feature, the apparatus further comprises logic which when executed is operable to install a path to a destination node in a core subdomain if the number of identifiers exceeds a suppression threshold.

In a further feature, the apparatus further comprises logic which when executed is operable to exclude a subdomain identifier of the apparatus from the number of subdomain identifiers associated with the nodes from the path when the apparatus comprises a non-core subdomain node. In still another feature, the apparatus further comprises logic which when executed is operable to determine whether the path has an equal cost path split and to include identifiers on each path in the number of identifiers.

In a further feature, the apparatus further comprises logic which when executed is operable to identify the number of subdomain identifiers by performing a shortest path first computation. In another feature, if the destination node comprises a core subdomain node then it is added during a further shortest path first computation.

In another feature, each non-core subdomain comprises any one of a respective distinctive identifier, a common identifier, or a common identifier comprising an identifier bit. In yet another feature, the subdomain identifier is associated with any one of the destination node or an adjacent link over which the destination node is reached.

In still another feature, the apparatus further comprises logic which when executed is operable to compute the path information using any one of a link state protocol, border gateway protocol, or routing vector protocol.

In other aspects, the invention encompasses a method and a computer readable medium configured to carry out the functions of the apparatus.

2.0 Structural and Functional Overview

Figure 1:
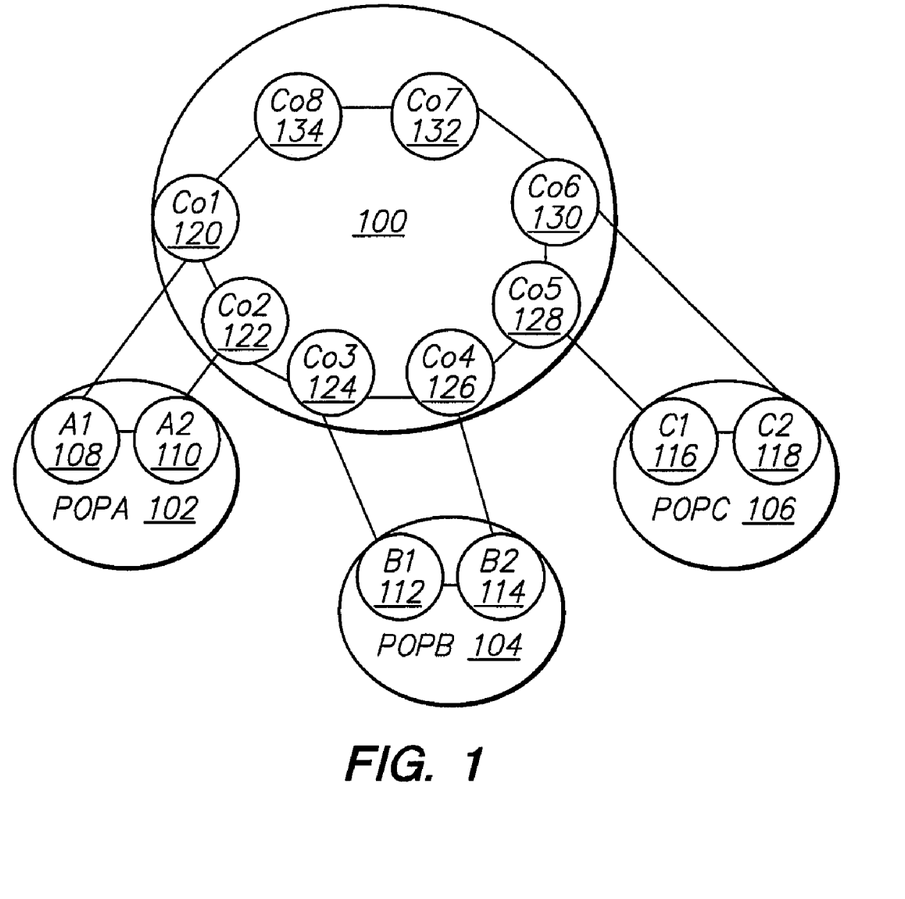
FIG. 1 illustrates an example network.

FIG. 1 illustrates an example data communications network. Any appropriate network topology can be used in various embodiments.

The network of FIG. 1 comprises a single routing domain, that is, a domain in which all nodes use a common routing protocol for example an intermediate system—intermediate system (IS-IS) area. In particular the network includes a core subdomain 100 and non-core subdomains 102, 104, 106 each of winch can comprise for example, a point of presence (POP). In the embodiment shown the three non-core subdomains comprise POPA 102, POPB 104, POPC 106 each having respective nodes A1, A2, 108, 110, B1, B2, 112, 114 and C1, C2, 116, 118. The core subdomain includes nodes Co1, to Co8, reference numerals 120, 122, 124, 126, 128, 130, 132, 134.

In some instances it is desirable to build a topology comprising a core and a number of POPs as part of a single routing domain providing full connectivity but, in the event of a failure in the core, preventing traffic being forwarded through one POP to another. In some instances it is preferable that such traffic is dropped for example in the case where some POPs or the connection to them provide an unacceptably low bandwidth, where it is desirable to avoid disruption or where there are differing security levels between POPs.

Figure 2:
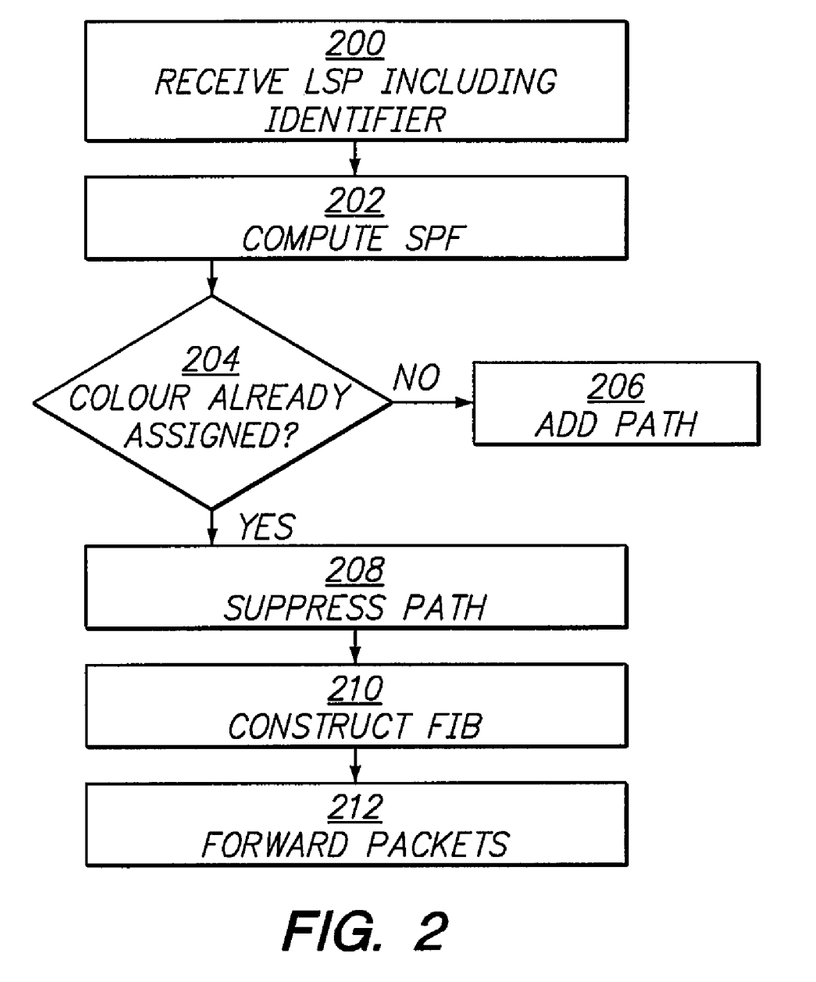
FIG. 2 is a flow diagram illustrating at a high level steps involved in implementing the methods.

The approach described herein can be understood in overview with reference to FIG. 2. FIG. 2 is a flow diagram illustrating an embodiment of computing path information in a data communication network. In FIG. 2, a network comprises as components nodes and links therebetween. The network comprises a core-subdomain of nodes and the plurality of non-core subdomains. For example, a network may comprise core-subdomain 100 and POPs 102, 104, 106, as shown in FIG. 1. In other embodiments, any appropriate network topology can be adopted.

The steps of FIG. 2 may be performed at an apparatus for computing path information to a destination node, for example a computing node such as node A1 in FIG. 1. In an embodiment, all nodes in the network carry out a similar computation.

Each node in the network is assigned an identifier. Alternatively, the identifier can be associated with a component such as a link as described in more detail below. In an embodiment, all nodes in a common POP are assigned the same identifier and each POP is assigned a different unique identifier. The nodes in the core subdomain can be provided with an identifier or alternatively can be distinguish by not having an identifier again as described in more detail below. Throughout the following discussion the identifiers are discussed in terms of "colors," merely for ease of understanding an example. In other embodiments, any appropriate form of identifier can be adopted. In the case of core nodes, by the same token, these can be considered to be "transparent" in the following discussion.

Each node in the network sends an LSP including the identifier. The color or transparency of each node is hence propagated in that node's LSP, for example, using a suitable field such as a sub-type length value (TLV) field in the form of a capability. Hence, referring to FIG. 1 where POPA components are colored red, POPB components are colored brown and POPC components are colored blue then the LSP, for example, from node C1 includes the identifier blue associated with the node or the link (over which the node C1 is reached. At step 200, the computing node receives the LSP from each other node in order to construct its forwarding table allowing it to compute path information to a destination node such as node C1.

At step 202 the computing node computes its SPF but using additionally the identifier or color associated with each LSP.

In an embodiment, the process derives the identifier from the LSP or other received reachability information and performs its path information computation in the form of the SPF dependent on the associated subdomain identifier. In particular as nodes are added to the SPF computation, the previous color of any of the parent nodes is copied into the computation having the effect that any path through any colored node acquires that color. If an attempt is made to add another node of a different color to an already colored path then that addition is forbidden meaning that a path cannot transverse a set of nodes with two different colors (unless specific conditions set out below are met).

At step 204, as each node is added the process assesses whether a color has already been assigned to a path allowing the path computation to be performed dependent of the number of non-core subdomain identifiers associated with nodes on the paths. If not, then at step 206 the path is added to the SPF tree.

In one approach, in addition, if the destination node is in a core subdomain then the path is added nonetheless in order to permit management traffic to be maintained through POPs under conditions of severe failure. If the computing node is a non-core subdomain node then it may disregard its own subdomain identifier when computing the number of non-core subdomain identifiers on the path, for example if its path passes through other nodes within the same non-core subdomain.

If, however, a color has already been assigned then at step 208 the path is suppressed as the color assignment means that the path must pass through more than one POP. As a result the computing node can update its FIB with paths only if they are permitted and do not traverse multiple POPs.

This can be understood further with reference to the topology shown in FIG. 1 where node A1 is computing node and node C1 is destination node from which an LSP is received including a "blue" identifier, in the case of failure of the link joining nodes Co3, Co4. In that case node A1's shortest path may be via nodes A2, Co2, Co3, Co4, Co5, C1, without the failure in place. In the event of failure of the Co3-Co4 link, node A1 may attempt to construct a path via Co1, Co2, Co3, B1, B2, Co4, Co5, C1. However in attempting to construct such a path, the node A1 imports not only the transparent color of the core nodes but also brown and blue (POPB, POPC) and as a result node A1 suppresses the path.

At step 210 the SPF computation continues until the FIB is constructed.

At step 212, by continuing the computation at node A1, an alternative path is found which does not traverse multiple POPs. For example, the path A1, Co1, Co8, Co7, Co6, Co5, C1 may be used. Node Co6 may communicate with node C1 via C2 depending on the cost.

In an embodiment, the process is performed in the control plane only and does not need a change to the forwarding decision process/algorithms. The resulting path may not be the shortest path but even so will be installed in the FIB without requiring updating of the forwarding decisions as the process steps are simply modified in the control plane.

In some instances the path can traverse more than one subdomain. For example, if the computing node or destination node is in the core subdomain, then the process herein may be modified by running additional SPF algorithms as described in more detail below. In addition, in the event that the path has an ECMP, then colors associated with each path on the ECMP can be treated as a separate path with respective identifiers to identify whether either path is permissible.

Path computation can be carried out according to any appropriate routing protocol including link state algorithms, routing vector protocols such as a distance vector protocol or a path vector protocol such as a border gateway protocol, and the reachability information may take any appropriate form.

As a result of the approaches described herein, disallowed routes can be prevented and alternative routes can be found by using information about specific node combinations when running a SPF computation. As a result, the approaches herein may be used to implement a control plane only solution, providing considerable flexibility in the specific constraints to be placed on the routes. As a result there is no requirement for specialized forwarding decisions or packet classifications, as only a single simply modified SPF run is required in many instances.

3.0 Approaches for Computing Path Information

Implementation of the approaches herein is now described in more detail with reference to the SPF algorithm, also known as Dijkstra's algorithm, which is known in the field. In general a particular node, say node A, calculates its least cost (shortest path) routes to each other node on the network from its LSDB. To do this, all nodes on the network are divided into three categories, unknown (UNK), tentative or candidate (TENT) and known (PATHS). For each node the cost of reaching that node from node A, and the interface along which it is reached at that cost (representing the next hop), are stored. Initially, node A is assigned to category TENT and all other nodes are assigned to UNK. The algorithm then carries out repeatedly the step of moving the lowest cost node in TENT to PATH and moving all neighbors of that lowest cost node together with their cost via the corresponding interface from node A to TENT.

As a result, in the first step node A is moved to PATH and each of its neighbors to TENT. In the next step the lowest cost node in TENT is moved into PATH and its neighbors are moved into TENT. Therefore, nodes in UNK and TENT gradually deplete until all nodes have been moved to PATH. Upon completion of the SPF algorithm, PATH comprises a list of the lowest cost interface (or next hop) for routing data from node A to each other node.

In an embodiment, when running an SPF according to the approach described herein, as each node is added to TENT, the previous color (if any) of the parent node in PATHS is copied into the node in TENT. As a result, any path through any colored node acquires that color, and paths can be suppressed if they traverse multiple domain colors. Hence a path can traverse a set of nodes with a single color or transparent but cannot traverse two different colors.

Figure 3:
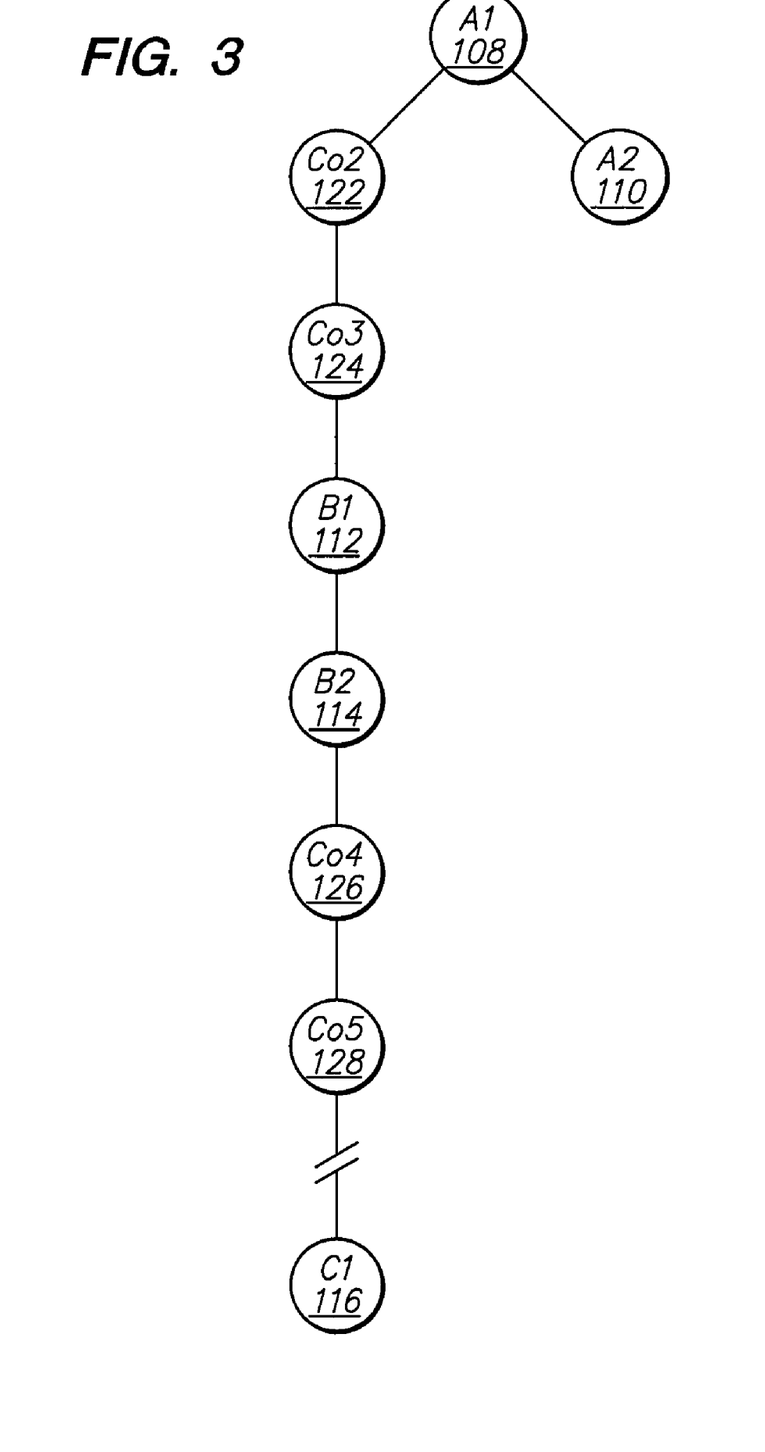
FIG. 3 illustrates a spanning tree constructed according to the approach as described herein.
Figure 4:
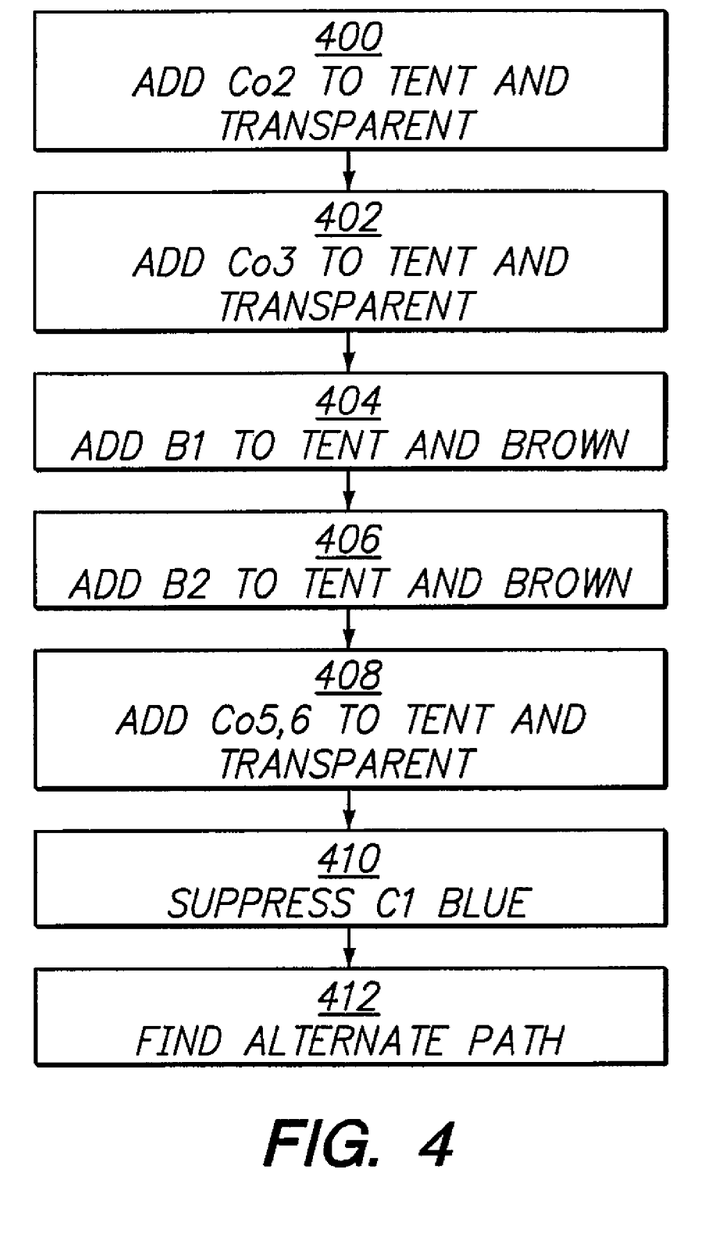
FIG. 4 is a flow diagram illustrating construction of a spanning tree shown in FIG. 3.

As an example, the approach can be understood in the context of a path computation computed at a computing node A1 for a destination node C1 in the event of failure of the link between nodes Co3 and Co4. An example is now described with reference to FIG. 3 and FIG. 4. FIG. 3 is a diagram of a shortest path tree constructed at node A1 and FIG. 4 is a flow diagram illustrating steps performed at node A1.

At step 400 node A1 adds Co2 to its TENT and the corresponding identifier (transparent). At step 402 node Co3 and the identifier "transparent" is also added. At step 404, upon failure of the link between node Co3 and node Co4, node B1 and the corresponding color brown is added. At step 406 node B2 and the corresponding color brown are added to TENT and at step 408 nodes Co5, Co6 are added together with "transparent". However upon addition of node C1, color blue, the path is suppressed because the number of identifiers or colors has exceeded the suppression threshold. As a result the SPF computation continues until an alternative route is found as discussed above. For example node A1 can discover a route A1, Co1, Co8, Co7, Co6, Co5, C1 (or Co6, C2, C1 depending on the costs) when constructing its shortest path tree.

The approach can be further understood according to the pseudo code of TABLE 1, in which the value "newcolor" is the color of the node to be added, "node" is the current node in the tree (having color node->color) to which the newcolor node "nbr" is being added, and the value "rootcolor" is the color of the computing node.

TABLE 1

EXAMPLE PSEUDOCODE IMPLEMENTATION

```
if (prmTransitPrevention( ))
{
    UINT newColor = nbr->lsp->color; // get color of node to be added
    if ((node->color == 0 && newColor == rootColor) || newColor == 0)
        // if current node is transparent and the new color is the
        // same as root color, or is transparent propagate existing color
        // unconditionally
        nbr->color = node->color;
    else
    { // new color is NOT transparent
        if (node->color == 0)
            // existing color is transparent so adopt the new color
            nbr->color = newColor;
        else
        { // existing route is colored
            if (node->color != newColor)
                // if new node is a different color
                // don't allow it
                continue;
            // otherwise propagate it
            nbr->color = newColor;
        }
    }
}
```

As expressed in the pseudo code, if the current node "node" (to which the new node "nbr" is being added) is transparent, then as long as the new node "nbr" is itself transparent or has the same color as the root color, then the existing color is propagated. If the current node "node" is transparent but the new node has a color that is different from the root node, then the color of the new node, new color, is added. However, if the current node is colored then the additional node is only added, and the color thereof adopted, if it is the same color as the existing propagated color.

As a result of the approach herein, a new node will attach to an existing transparent, i.e. core node allowing use of links even if at a high cost to attach POPs. Some core nodes may become unreachable if the core is partitioned, but this possibility can be avoided using the approach as described in more detail below.

It would be desirable in some cases to permit traffic from a core subdomain node or a non-core subdomain to traverse multiple non-core subdomain nodes if the destination lies in the core. For example, permitting such traffic could allow management traffic to be maintained through POPs under conditions of severe failure. Such traffic would typically be low bandwidth.

Figure 5:
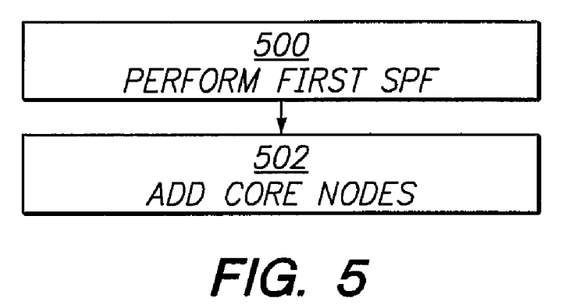
FIG. 5 is a flow diagram illustrating additional optional steps in implementing the approach described herein.

FIG. 5 is a flow diagram illustrating an alternate approach for computing path information.

At step 500, as discussed above, a further SPF is computed suppressing paths which traverse multiple POPs. According to this modified approach of FIG. 5, however, the paths to destination nodes in non-core subdomains and traversing multiple subdomains are suppressed but the tree computation continues and, at step 502, any additional core routers that are reached are attached. This approach allows essential traffic to be maintained by including the core nodes paths in the FIB. As an alternative, a first SPF can be run in the manner described above and a second SPF can be run to add core nodes.

The approaches described herein allow all nodes to arrive at a corresponding forwarding decision based on the same topology as all nodes compute the topology information according to the same rules.

Figure 6:
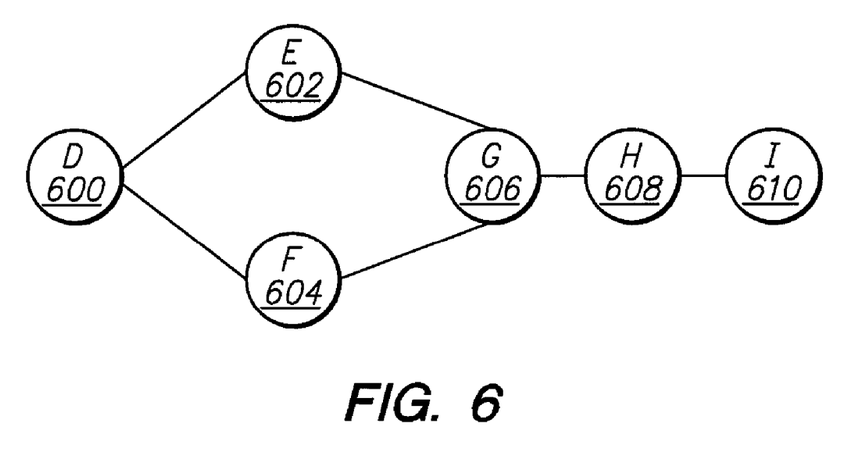
FIG. 6 is a representation of a network topology including an ECMP.

The computation rules can further be enhanced to accommodate ECMP scenarios. FIG. 6 is a network diagram illustrating such a scenario.

In FIG. 6 an example network topology is shown including nodes D, E, F, G, H, I, denoted by reference numerals 600, 602, 604, 608, 610. All links have cost 1 and nodes E and F provide equal cost or split paths between nodes D and G. In addition node H is connected to nodes G and I. Where there exists ECMP to a node about to be added to the SPF tree, the (two or more) split paths may have different colors having traversed different regions of the network. For example in the embodiment of FIG. 6 node E may have color red associated with it whereas nodes F and H may have color green associated with them.

In order to accommodate this scenario the set of colors rather than a single color can be propagated during the SPF computation and a path can only be accepted if the new color is contained in the existing set. The approach maintains the colors, if any, that are reached over each adjacency of the root node, including nodes that are reached by path split, so that the correct adjacency can be detected. For example, in FIG. 6, where nodes D, G and I are transparent it will be seen that node G can be reached from node D over either adjacency as only one POP is traversed. Both colors red and green are propagated in the SPF computation to node H. Node H is added but only the color green is associated with it, that is, the path D F G H as node E has another color and would thus require traversing two POPs. The path is then extended to node I, again marked green, ensuring that traffic for node G can traverse either of nodes E or F but traffic nodes for H and I can only traverse node F from node D.

Any type of topology can be implemented and any appropriate suppression threshold can be identified. For example, a suppression threshold may indicate the maximum number of colors permissible on a route as long as consistent rule is applied at all nodes in the control plane. Similarly, instead of coloring the node the link to the destination can be appropriately colored or otherwise identified to the same effect. Any appropriate path information computation can be performed dependent on the color or identifier. For example, the secondary SPF can be performed. The identifier itself can be of any suitable type, for example, using a single bit rather than a range of colors to mark restricted paths.

In addition, the approach can be adopted in relation to any appropriate type of routing protocol and embodiments are not limited to using a link state protocol. For example, alternate embodiments may use a distance vector routing protocol, such as the routing information protocol (RIP) that is described in Internet Engineering Task Force (IETF) Request for Comments (RFC) 1058 and RFC 1723. Generally, in a distance vector routing protocol, each node must compute its next hop to a destination on the basis of some form of least cost path. According to RIP, in order for a node in the network to derive this information, each node advertises to its neighbors a reachability metric indicating its (lowest) cost to each destination based upon reachability information that it receives. The approach allows iterative building of the forwarding table as each node receives further information propagated hop by hop through the network allowing convergence on a least cost value for each destination and an associated next hop.

Therefore, when a distance vector routing protocol is used in an embodiment, the path is in effect constructed from the destination towards the computing node, and the identifier is associated with the RIP advertisement.

Referring, for example, to FIG. 1, in establishing a path from node A1 to node C1, C1 advertises its reachability metric for all destinations together with color or identifier blue, inter alia, to node Co5. Node Co5 sends its advertisement inter alia to node Co4 retaining the blue color and indicating its own color (transparent). Assuming failure of the link joining nodes Co3 and Co4, node Co4 advertises its reachability metric together with color blue and its own color, transparent to node B2. Node B2 advertises both blue and brown to node B1 which advertises its reachability metric with blue and brown to node Co3 and then Co2. However, at node A2, which has its own color red, further propagation is suppressed and node A will suppress the path itself. In the case of ECMP, by maintaining both path split colors a "permissible" route can be selected, where available, from multiple possible routes.

In addition, other routing protocols such as Border Gateway Protocol (BGP) as described in IETF RFC 1771 or label distribution protocol (LDP) can equally incorporate the approaches described herein. For example in the case of BGP the identifier can comprise a common attribute, whereas in routing or distance protocols such as RIP the identifier can be implemented as an extension.

The approaches described herein can be implemented in any appropriate manner, for example, by appropriate modifications to the forwarding path computation and forwarding information advertisements. The approaches can be implemented in hardware or software or firmware using microcode.

4.0 Implementation Mechanisms—Hardware Overview

Figure 7:
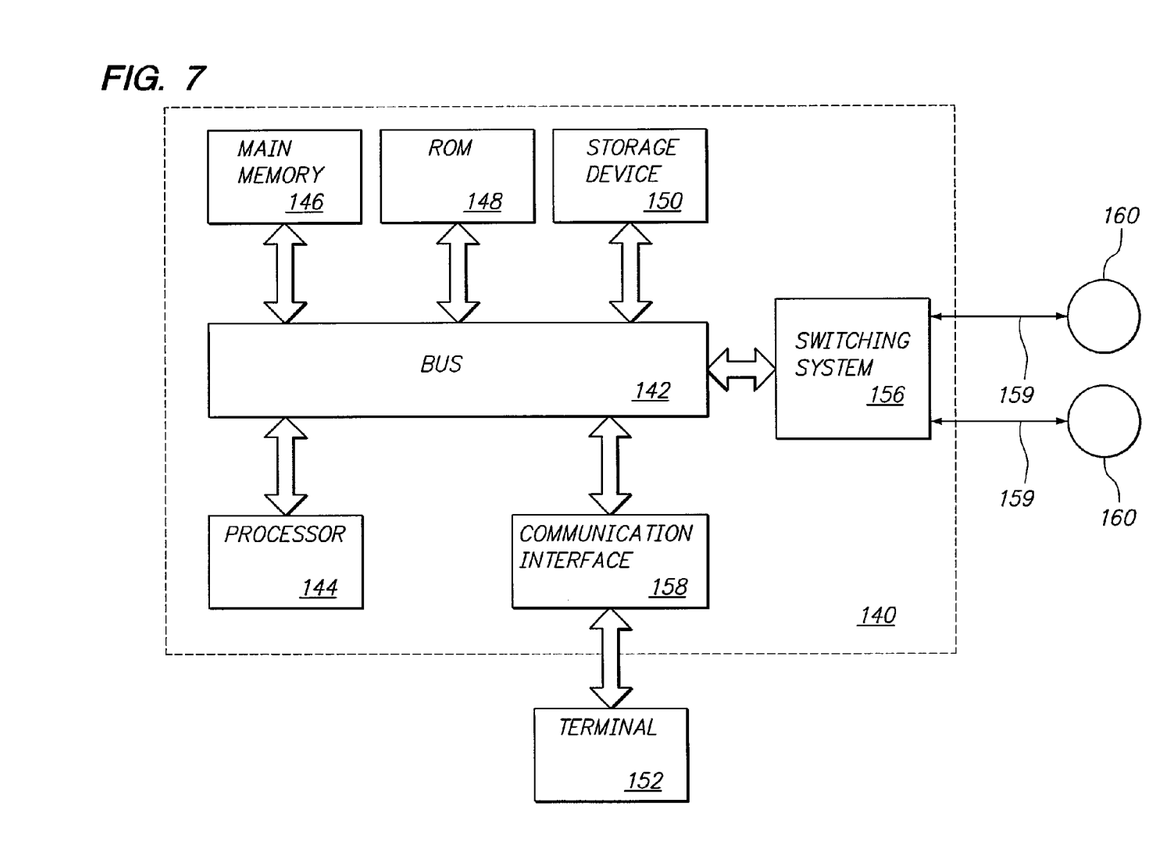
FIG. 7 is a block diagram illustrating a computer system upon which the method may be implemented.

FIG. 7 is a block diagram that illustrates a computer system 140 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a node or router acting as computing node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The approaches herein can be implemented for any size or type of network. Any appropriate routing protocol and mechanism can be adopted to implement the invention. For example, routing protocols such as Intermediate System— Intermediate System (IS-IS) or Open Shortest Path First (OSPF) can be used. Networks using any appropriate forwarding mechanism such as Internet Protocol (IP) can be used.

Although the present disclosure refers to "core" and "non-core" subdomains, the approaches herein can be applied to any separate or distinguished regions of a common domain, for example having differing requirements as to the nature of traffic which can enter or transit each, or sets of, subdomains.

The approach described herein can be implemented in relation to any domain carrying a common routing protocol such as an IGP domain or alternative system and in relation to a network comprising one or more non-core subdomains, such as POPs, as well as one or more core subdomains as appropriate. Any other form of identifier or other classification can be implemented to allow the approaches described herein to be adopted.

What is claimed is:

1. An apparatus, comprising:
   one or more processors;
   first logic which when executed is operable to receive reachability information for a destination node and an associated identifier;
   second logic which when executed is operable to perform a computation of path information for a path in a network to the destination node dependent on a particular identifier of a subdomain associated with the destination node and a non-core subdomain identifier associated with a plurality of nodes of a non-core subdomain on the path, and to forward data for the destination node over the path according to the path information;
   wherein the network comprises nodes and links therebetween as components and comprises a core subdomain of components and a plurality of non-core subdomains of components.

2. An apparatus as claimed in claim 1, further comprising logic which when executed is operable to perform the path computation dependent on a number of non-core subdomain identifiers associated with components on the path to the destination node.

3. An apparatus as claimed in claim 2, further comprising logic which when executed is operable to suppress the path to the destination node in the non-core subdomain.

4. An apparatus as claimed in claim 3, further comprising logic which when executed is operable to suppress the path if the number of non-core subdomain identifiers exceeds a suppression threshold.

5. An apparatus as claimed in claim 4, further comprising logic which when executed is operable to identify a second path to the destination node as an alternative to the suppressed path.

6. An apparatus as claimed in claim 2, further comprising logic which when executed is operable to install the path to the destination node in the core subdomain if the number of identifiers exceeds a suppression threshold.

7. An apparatus as claimed in claim 2, further comprising logic which when executed is operable to exclude a subdomain identifier of the apparatus from the number of subdomain identifiers associated with the nodes from the path when the apparatus comprises a non-core subdomain node.

8. An apparatus as claimed in claim 2, further comprising logic which when executed is operable to determine whether the path has an equal cost path split and to include identifiers on each path in the number of identifiers.

9. An apparatus as claimed in claim 2, further comprising logic which when executed is operable to identify the number of subdomain identifiers by performing a shortest path first computation.

10. An apparatus as claimed in claim 9 in which, if the destination node comprises a core subdomain node then it is added during a further shortest path first computation.

11. An apparatus as claimed in claim 1 wherein each non-core subdomain comprises any one of a respective distinctive identifier, a common identifier, or a common identifier comprising an identifier bit.

12. An apparatus as claimed in claim 1 wherein the subdomain identifier is associated with any one of the destination node or an adjacent link over which the destination node is reached.

13. An apparatus as claimed in claim 1, further comprising logic which when executed is operable to compute the path information using any one of a link state protocol, border gateway protocol, or routing vector protocol.

14. An apparatus, comprising:
    one or more processors;
    means for receiving reachability information for a destination node and an associated identifier;
    means for performing a computation of path information for a path in a network to the destination node dependent on a particular identifier of a subdomain associated with the destination node and a non-core subdomain identifier associated with a plurality of nodes of a non-core subdomain on the path;
    means for forwarding data for the destination over the path according to the path information;
    wherein the network comprises nodes and links therebetween as components and comprises a core subdomain of components and a plurality of non-core subdomains of components.

15. An apparatus as claimed in claim 14, further comprising means for performing the path computation dependent on a number of non-core subdomain identifiers associated with components on the path to the destination node.

16. An apparatus as claimed in claim 15, further comprising means for suppressing the path to the destination node in the non-core subdomain.

17. An apparatus as claimed in claim 16, further comprising means for suppressing the path if the number of non-core subdomain identifiers exceeds a suppression threshold.

18. An apparatus as claimed in claim 17, further comprising means for identifying a second path to the destination node as an alternative to the suppressed path.

19. A method, comprising:
    receiving reachability information for a destination node and an associated identifier;
    performing a path information computation for a path in a network to the destination node dependent on a particular identifier of a subdomain associated with the destination node and a non-core subdomain identifier associated with a plurality of nodes of a non-core subdomain on the path;
    forwarding data for the destination node over the path according to the path information;

wherein the network comprises nodes and links therebetween as components and comprises a core subdomain of components and a plurality of non-core subdomains of components;

wherein the method is performed by one or more processors.

20. A computer readable volatile or non-volatile storage medium storing one or more sequences of instructions which, when executed by one or more processors cause the one or more processors to perform:

receiving reachability information for a destination node and an associated subdomain identifier;

performing a path information computation for a path in a network to the destination node dependent on the associated subdomain identifier of a subdomain associated with the destination node and a non-core subdomain identifier associated with a plurality of nodes of a non-core subdomain on the path;

forwarding data for the destination over the path according to the path information;

wherein the network comprises nodes and links therebetween as components and comprises a core subdomain of components and a plurality of non-core subdomains of components.

21. A computer readable medium as claimed in claim 20, further comprising instructions, which when executed, cause performing the path computation dependent on a number of non-core subdomain identifiers associated with components on the path to the destination node.

22. A computer readable medium as claimed in claim 21, further comprising instructions, which when executed, cause suppressing the path to the destination node in the non-core subdomain.

23. A computer readable medium as claimed in claim 22, further comprising instructions, which when executed, cause suppressing the path if the number of non-core subdomain identifiers exceeds a suppression threshold.

24. A computer readable medium as claimed in claim 23, further comprising instructions, which when executed, cause identifying a second path to the destination node as an alternative to the suppressed path.

25. A method as claimed in claim 19, further comprising performing the path computation dependent on a number of non-core subdomain identifiers associated with components on the path to the destination node.

26. A method as claimed in claim 25, further comprising suppressing the path to the destination node in the non-core subdomain.

27. A method as claimed in claim 26, further comprising suppressing the path if the number of non-core subdomain identifiers exceeds a suppression threshold.

28. A method as claimed in claim 27, further comprising identifying a second path to the destination node as an alternative to the suppressed path.

* * * * *